(12) United States Patent
Sakakibara

(10) Patent No.: US 8,395,918 B2
(45) Date of Patent: Mar. 12, 2013

(54) METHOD OF AND APPARATUS FOR CONTROLLING THREE-LEVEL CONVERTER USING COMMAND VALUES

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 174 days.

(21) Appl. No.: 12/922,362

(22) PCT Filed: Feb. 17, 2009

(86) PCT No.: PCT/JP2009/052695
§ 371 (c)(1),
(2), (4) Date: Sep. 13, 2010

(87) PCT Pub. No.: WO2009/113367
PCT Pub. Date: Sep. 17, 2009

(65) Prior Publication Data
US 2011/0085361 A1   Apr. 14, 2011

(30) Foreign Application Priority Data
Mar. 14, 2008   (JP) .................................. 2008-065888

(51) Int. Cl.
*H02M 7/217*   (2006.01)
*H02M 7/08*   (2006.01)
(52) U.S. Cl. .......................................... 363/127; 363/67
(58) Field of Classification Search .................. 363/44, 363/81, 84, 86, 123, 125, 127, 65, 67–70, 363/74, 78
See application file for complete search history.

(56) References Cited

U.S. PATENT DOCUMENTS

| | | | |
|---|---|---|---|
| 5,808,882 A | 9/1998 | Mochikawa | |
| 6,031,738 A | 2/2000 | Lipo et al. | |
| 6,545,887 B2 * | 4/2003 | Smedley et al. | 363/89 |
| 7,986,538 B2 * | 7/2011 | Harke | 363/67 |
| 2003/0128563 A1 * | 7/2003 | Rojas Romero | 363/89 |
| 2006/0215425 A1 * | 9/2006 | Fu et al. | 363/37 |
| 2008/0042605 A1 * | 2/2008 | Subrata et al. | 318/449 |
| 2009/0040800 A1 * | 2/2009 | Sonnaillon et al. | 363/89 |

FOREIGN PATENT DOCUMENTS

| | | |
|---|---|---|
| EP | 0 660 498 A2 | 6/1995 |
| JP | 6-233537 A | 8/1994 |

(Continued)

OTHER PUBLICATIONS

Kolar et al., "A Novel Three-Phase Utility Interface Minimizing Line Current Harmonics of High-Power Telecommunications Rectifier Modules", 1997, IEEE, pp. 456-467.*

(Continued)

*Primary Examiner* — Adolf Berhane
*Assistant Examiner* — Jeffrey Gblende
(74) *Attorney, Agent, or Firm* — Birch, Stewart, Kolasch & Birch, LLP

(57) ABSTRACT

Controlled by switching is which reactor in a reactor group present between a power source and a three-level converter is to be connected to an intermediate point that outputs a midpoint potential. In the switching, the closer to the command value of the midpoint potential the command values of input potentials of the converter are, the greater the duty at which corresponding reactors are connected to the intermediate point is for pulse width modulation. Additionally, a predetermined range to be compared with the command values has a predetermined potential width with respect to an AC waveform centered around the command value of the midpoint potential.

12 Claims, 14 Drawing Sheets

FOREIGN PATENT DOCUMENTS

| | | |
|---|---|---|
| JP | 8-187000 A | 7/1996 |
| JP | 9-182441 A | 7/1997 |
| JP | 9-238478 A | 9/1997 |
| JP | 2754519 B2 | 3/1998 |
| JP | 2002-142458 A | 5/2002 |
| JP | 2003-174779 A | 6/2003 |
| JP | 2004-104909 A | 4/2004 |
| JP | 2006-115609 A | 4/2006 |

OTHER PUBLICATIONS

Kolar et al., "A Novel Three-Phase Utility Interface Minimizing Line Current Harmonics of High-Power Telecommunications Rectifier Modules," IEEE, Transactions on Industrial Electronics, vol. 44, No. 4, pp. 456-467, Aug. 1997.

Compiled by the Institute of Electrical Engineers of Japan (IEEJ), Semiconductor Power Conversion System Investigation Expert Committee, "Power Electronics Circuit," Ohmsha, Ltd., pp. 176-177, Nov. 2000.

Ichikawa et al., "A Control Scheme of Power Line Compensator with Multiple Function for Maintaining Power Quality," the Institute of Electrical Engineers of Japan (IEEJ), The Papers of Techinal Meeting on Semiconductor Power Converter, SPC-96-127, Dec. 11, 1996.

Kolar et al., "DC Link Voltage Balancing of a Three-Phase/Switch/Level PWM (Vienna) Rectifier by Modified Hysteresis Input Current Control," Power Conversion Proceedings, pp. 443-465, Jun. 1995.

Sakai et al., "Control Methods for Reduction of DC Link Capacitor and Restarting at Instantaneous Power Failure in PWM Converter," the Institute of Electrical Engineers of Japan (IEEJ), Academic Journal D., vol. 112, No. 1, 1992.

Zhao et al., "Force Commutated Three Level Boost Type Rectifier," Wisconsin Electric Machines and Power Electronis Consortium (WEMPEC), pp. 771-777, Aug. 1993.

\* cited by examiner

F I G. 1
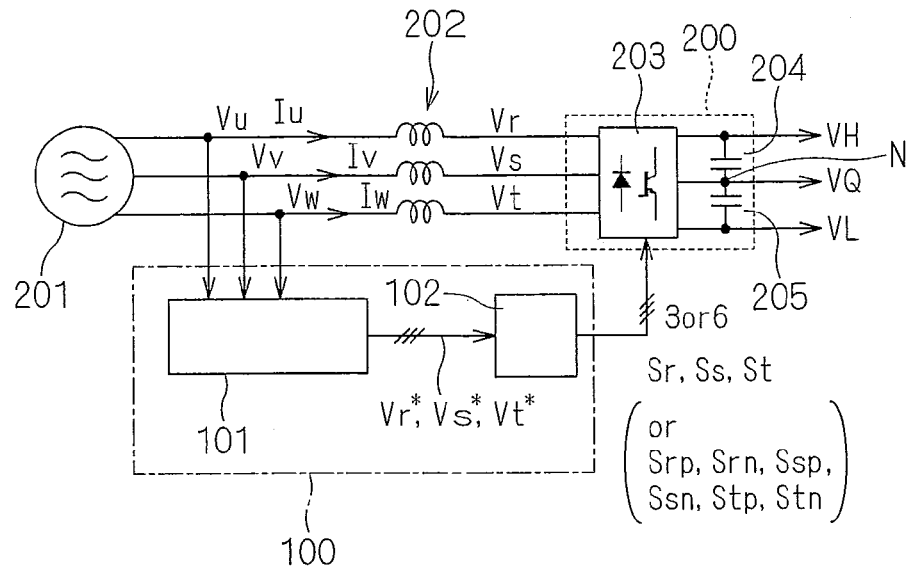
F I G. 2
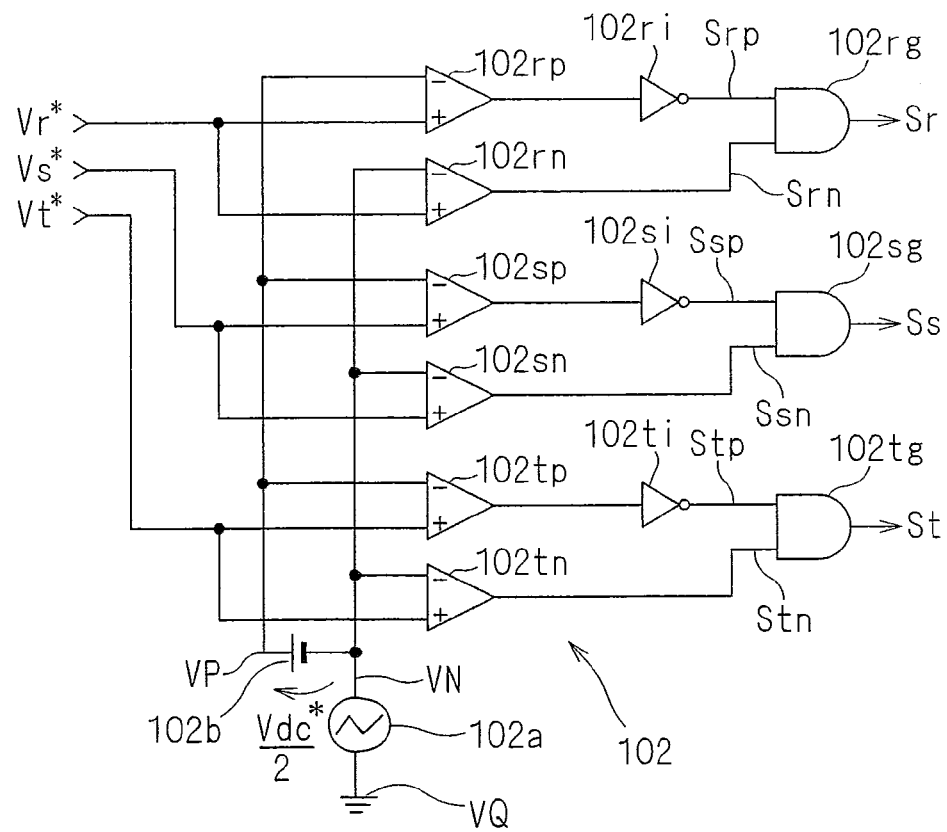

F I G . 6
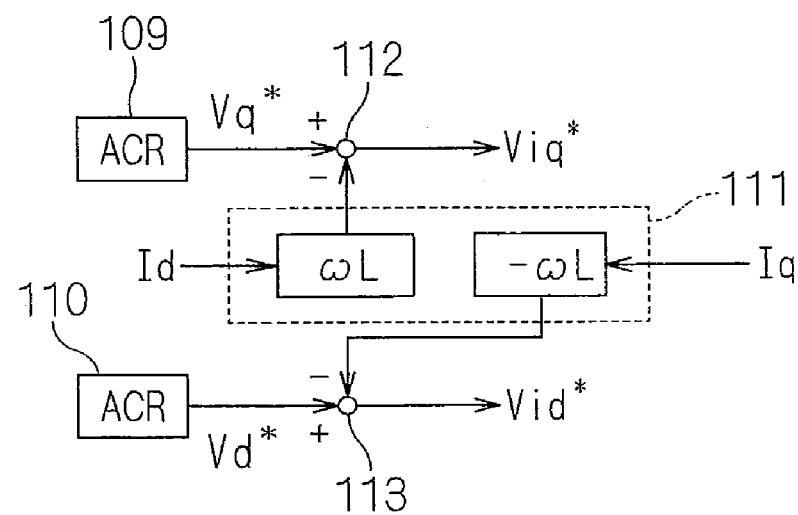

F I G. 8
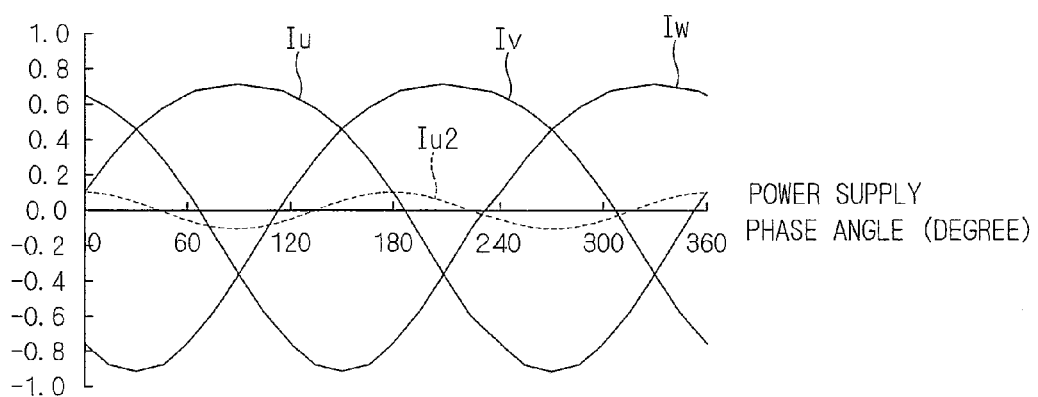
F I G. 9
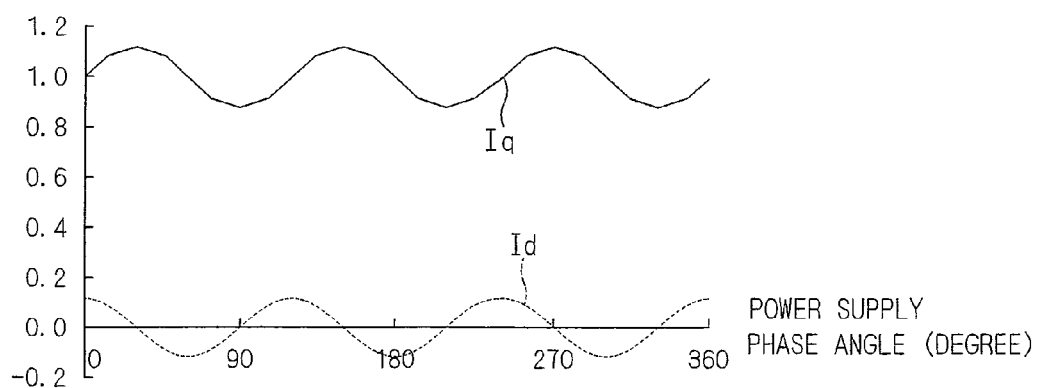

F I G. 1 0
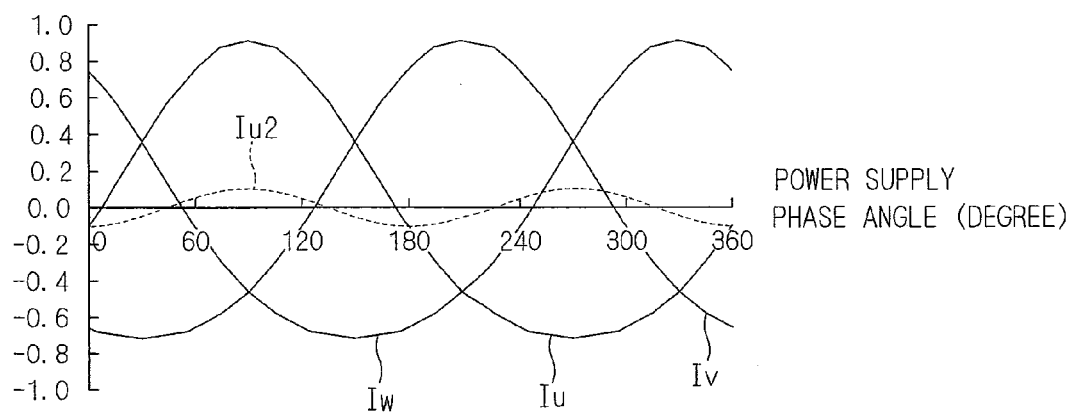
F I G. 1 1
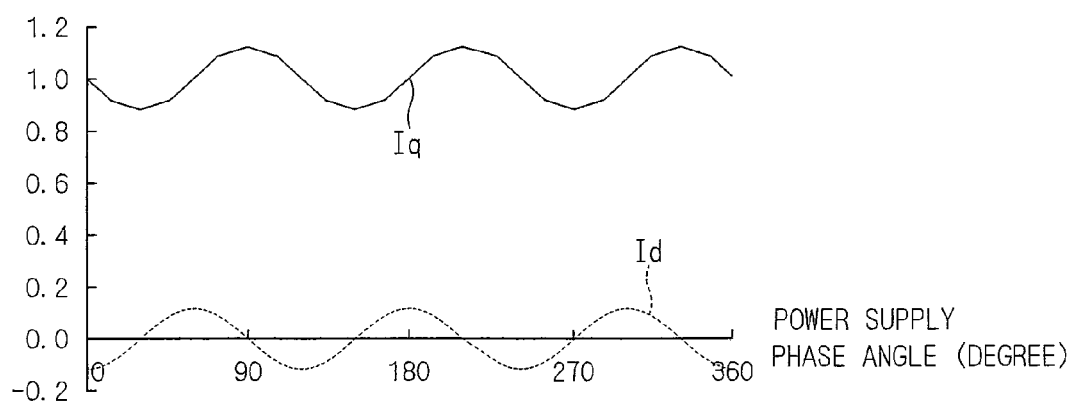

PRIOR ART

FIG. 18

PRIOR ART

US 8,395,918 B2

METHOD OF AND APPARATUS FOR CONTROLLING THREE-LEVEL CONVERTER USING COMMAND VALUES

TECHNICAL FIELD

The present invention relates to a technique for controlling a converter and, more particularly, to a technique for controlling a three-level converter.

BACKGROUND ART

There has been proposed what is called a three-level converter that obtains three levels of DC potential from a three-phase rectifier circuit. The three-level converter is illustrated, for example, in Specification of European Patent Application Publication No. 0660498, Japanese Patent Application Laid-Open No. 9-182441 (1997) and Japanese Patent Application Laid-Open No. 2002-142458 and J. W. Kolar, U. Drofenik, F. C. Zach, "DC link voltage balancing of a three-phase/switch/level PWM (VIENNA) rectifier by modified hysteresis input current control", Proc. of Power Conversion Conference 1995, 1995, pp. 443-465 and Zhao, Y., Y. Li, T. A. Lipo, "Force Commutated Three-Level Boost Type Rectifier", IEEE-IAS Conference Record, October 1993, vol. II, 1993, pp. 771-777 to be described below.

FIG. 16 is a circuit diagram of a three-level converter presented in FIG. 4 of Specification of European Patent Application Publication No. 0660498. A three-phase voltage is applied to first ends of respective inductors 8, 9 and 10 that are a set of three reactors. The inductors 8, 9 and 10 have second ends, respectively, connected through feeders 11, 12 and 13 to terminals 14, 15 and 16. The terminals 14, 15 and 16 function as input ends of a power supply three-phase diode bridge 17 composed of diodes 18, 19, 20, 24, 25 and 26. The power supply three-phase diode bridge 17 has outputs connected through feeders 21 and 27 to capacitors 6 and 7, respectively.

The terminals 14, 15 and 16 are connected through bidirectional switches 30, 31 and 32, respectively, to a neutral point 33. A switching element 61 in the bidirectional switch 30 has a collector 77 and an emitter 78. A switching element 61 in the directional switch 31 has a collector 79 and an emitter 80. A switching element 61 in the bidirectional switch 32 has a collector 81 and an emitter 82.

The conduction of any one of the switching elements 61 causes the potential at any one of the terminals 14, 15 and 16 to be applied through a feeder 34 to an intermediate point 35 between the series-connected capacitors 6 and 7. A DC voltage is developed at output ends 23 and 29 by the function of the three-phase diode bridge 17.

FIG. 17 is a circuit diagram of a three-level converter presented in FIG. 1 of Zhao, Y., Y. Li, T. A. Lipo, "Force Commutated Three-Level Boost Type Rectifier", IEEE-IAS Conference Record, October 1993, vol. II, 1993, pp. 771-777. A similar circuit is also presented in FIG. 4 of Japanese Patent Application Laid-Open No. 2002-142458. In the circuit, three phase currents Ia, Ib and Ic flow from the side of three phase voltages Va, Vb and Vc.

The current Ia flows either through a diode D12 and a switch S11 or through a diode D13 and a switch S12 to become a current In flowing to a neutral point n. Otherwise the current Ia flows either through diodes D11 and D12 or through diodes D13 and D14 to the capacitors. The current Ib flows either through a diode D22 and a switch S21 or through a diode D23 and a switch S22 to become the current In. Otherwise the current Ib flows either through diodes D21 and D22 or through diodes D23 and D24 to the capacitors. The current Ic flows either through a diode D32 and a switch S31 or through a diode D33 and a switch S32 to become the current In. Otherwise the current Ic flows either through diodes D31 and D32 or through diodes D33 and D34 to the capacitors.

In this manner, the switches S11, S22 and S31 and the switches S12, S22 and S32 are separately responsible for breakdown voltage during the time interval that the phase voltages are positive and during the time interval that the phase voltages are negative, and charge the two capacitors to a voltage of Vd/2.

Thus, it is sufficient for the breakdown voltage of the switches S11 to S32 to be approximately one-half that of the switching element 61 in the circuit shown in FIG. 16. However, the number of switching elements in the circuit shown in FIG. 17 doubles the number of switching elements in the circuit shown in FIG. 16.

FIG. 18 is a circuit diagram of a three-level converter presented in FIG. 1 of Japanese Patent Application Laid-Open No. 9-182441 (1997). A feeder 48 is connected through feeders 37 and 38 to the output ends 23 and 29. Together with a feeder 47 connected to the intermediate point 35, the feeder 48 is given to a control unit 40, whereby the measurement values of output voltages are provided to the control unit 40. Phase voltages from a three-phase power supply 5 (phase power supplies 2, 3 and 4) are provided through feeders 44 to 46 (coupled to each other into the form of a three-phase feeder 42) to the control unit 40. An external control signal 41 is separately provided to the control unit 40.

A similar circuit is presented in FIG. 1(a) of J. W. Kolar, U. Drofenik, F. C. Zach, "DC link voltage balancing of a three-phase/switch/level PWM (VIENNA) rectifier by modified hysteresis input current control", Proc. of Power Conversion Conference 1995, 1995, pp. 443-465 and in FIG. 2 of Japanese Patent Application Laid-Open No. 9-182441 (1997). In this circuit, it is sufficient for the breakdown voltage required for switching elements to be approximately one-half that in the circuit shown in FIG. 16, and the number of switching elements in this circuit does not increase.

Japanese Patent No. 2754519 and Japanese Patent Application Laid-Open No. 2006-115609 and Fumitoshi Ichikawa, and five others, "A Control Scheme of Power Line Compensator with Multiple Function for Maintaining Power Quality", the Institute of Electrical Engineers of Japan (IEEJ), The Papers of Technical Meeting on Semiconductor Power Converter, SPC-96-127, Keijiroo Sakai, and three others, "Control Methods for Reduction of DC Link Capacitor and Restarting at Instantaneous Power Failure in PWM Converter" the Institute of Electrical Engineers of Japan (IEEJ), Academic Journal D, Vol. 112, No. 1, Heisei 4 (1992) and Compiled by the Institute of Electrical Engineers of Japan (IEEJ), Semiconductor Power Conversion System Investigation Expert Committee, "Power Electronics Circuit", Ohm-sha, Ltd., pp. 176-177, Nov. Heisei 12 (2000) are listed as other documents associated with the present application.

DISCLOSURE OF INVENTION

Problems to be Solved by the Invention

For the switching control over the configurations shown in FIGS. 16 and 18, simple control by a hysteresis comparator has also been proposed, as presented in J. W. Kolar, U. Drofenik, F. C. Zach, "DC link voltage balancing of a three-phase/switch/level PWM (VIENNA) rectifier by modified hysteresis input current control", Proc. of Power Conversion Conference 1995, 1995, pp. 443-465. However, such control necessitates the individual control of the currents for three phases. Additionally, it is necessary to detect whether the flowing current is positive or negative.

For the switching control over the configuration shown in FIG. 17, a control scheme in which a comparison is made with a carrier has been proposed, as presented in Japanese Patent Application Laid-Open No. 2002-142458. However, this involves the need to do switching between circuits for controlling currents depending on the polarity of a power supply voltage. Thus, six current control loops are needed to meet the requirement for the three-phase power supply. Additionally, a control circuit for keeping a midpoint potential between DC voltages in equilibrium is also required for the current control loops.

Thus, the present invention provides a technique for controlling a three-level converter in which there is no need to detect the polarities of a power supply voltage and a current flowing through the converter.

Means for Solving the Problems

A method of controlling a converter according to the present invention is a method of controlling a converter including a rectifier circuit (203) for outputting a low potential (VL), a high potential (VH) higher than said low potential, and a midpoint potential (VQ) between said low potential and said high potential, a first capacitor (205; 7) receiving said low potential and said midpoint potential, and a second capacitor (204; 6) connected at a connection point (35; N) to said first capacitor, and receiving said high potential and said midpoint potential. In the converter, said rectifier circuit includes a three-phase diode bridge (18, 19, 20, 24, 25, 26; D11, D21, D31, D14, D24, D34) for rectifying first to third potentials (Vr, Vs, Vt) at second ends of a set of three reactors (202; 8, 9, 10), respectively, having first ends to which a three-phase voltage (Vu, Vv, Vw) is applied, to thereby output said low potential and said high potential, and a switch group (30, 31, 32; S11, S21, S31, S12, S22, S32) for selectively connecting said second ends of said three reactors to said connection point.

In a first aspect of the method of controlling the converter according to the present invention, when first to third command values (Vr*, Vs*, Vt*) that are command values for said first to third potentials, respectively, are in a predetermined range, said switch group connects said second ends corresponding to the respective command values to said connection point, and a range having a predetermined potential width with respect to an AC waveform (VK) centered around the command value (0) of said midpoint potential is used as said predetermined range.

A second aspect of the method of controlling the converter according to the present invention is the first aspect thereof wherein both the amplitude of said AC waveform and said predetermined potential width are one-half the command value (Vdc*) of the output voltage (Vdc) obtained by subtracting said low potential (VL) from said high potential (VH).

A third aspect of the method of controlling the converter according to the present invention is the second aspect thereof that comprises: making a three-phase to two-phase conversion of a three-phase current (Iu, Iv, Iw) flowing through said reactors to determine a first component (Id) perpendicular in phase to said three-phase voltage (Vu, Vv, Vw), and a second component (Ig) in phase with said three-phase voltage; determining a fourth command value (Vid*), based on said first component; determining a second component command value (Ig*) that is the command value of said second component, based on a difference between said output voltage (Vdc) and said command value (Vdc*) of said output voltage; determining a fifth command value (Viq*), based on a difference between said second component and said command value of said second component; and making a two-phase to three-phase conversion of said fourth command value and said fifth command value to determine said first to third command values (Vr*, Vs*, Vt*).

A fourth aspect of the method of controlling the converter according to the present invention is the third aspect thereof wherein said fourth command value and said fifth command value are determined from said first component (Id), said second component (Iq), and said second component command value (Iq*) in a frequency band that is three times the frequency of said three-phase voltage (Vu, Vv, Vw) or more.

A fifth aspect of the method of controlling the converter according to the present invention is the fourth aspect thereof wherein the frequency of said AC waveform (VK) is three times the frequency of said three-phase voltage (Vu, Vv, Vw) or more.

A sixth aspect of the method of controlling the converter according to the present invention is the fifth aspect thereof wherein said first component (Id) is corrected using a first harmonic ($\cos 3\omega t$) having a frequency three times the frequency of said three-phase voltage (Vu, Vv, Vw) when said fourth command value (Vid*) is determined, and wherein said second component (Iq) is corrected using a second harmonic ($\sin 3\omega t$) perpendicular in phase to said first harmonic when said fifth command value (Viq*) is determined.

An apparatus for controlling a converter according to the present invention is an apparatus for controlling a converter including a rectifier circuit (203) for outputting a low potential (VL), a high potential (VH) higher than said low potential, and a midpoint potential (VQ) between said low potential and said high potential, a first capacitor (205; 7) receiving said low potential and said midpoint potential, and a second capacitor (204; 6) connected at a connection point (35; N) to said first capacitor, and receiving said high potential and said midpoint potential. In the converter, said rectifier circuit includes a three-phase diode bridge (18, 19, 20, 24, 25, 26; D11, D21, D31, D14, D24, D34) for rectifying first to third potentials (Vr, Vs, Vt) at second ends of a set of three electric reactors (202; 8, 9, 10), respectively, having first ends to which a three-phase voltage (Vu, Vv, Vw) is applied, to thereby output said low potential and said high potential, and a switch group (30, 31, 32; S11, S21, S31, S12, S22, S32) for selectively connecting said second ends of said three reactors to said connection point.

A first aspect of the apparatus for controlling the converter according to the present invention comprises: a voltage command value generating section (101; 122, 104) for generating first to third command values (Vr*, Vs*, Vt*) that are command values for said first to third potentials, respectively, from said three-phase voltage; and a pulse width modulator (102) for generating switching signals (Srp, Sm, Ssp, Ssn, Stp, Stn; Sr, Ss, St) for causing said switch group to connect said second ends corresponding to the respective command values to said connection point when said respective first to third command values are in a range having a predetermined potential width with respect to an AC waveform (VK) centered around the command value (0) of said midpoint potential.

A second aspect of the apparatus for controlling the converter according to the present invention is the first aspect thereof wherein the amplitude of said AC waveform and said predetermined potential width are one-half the command value (Vdc*) of the output voltage (Vdc) obtained by subtracting said low potential (VL) from said high potential (VH).

A third aspect of the apparatus for controlling the converter according to the present invention is the second aspect thereof that further comprises: a three-phase to two-phase converter (103) for determine a first component (Id) perpendicular in phase to said three-phase voltage (Vu, Vv, Vw), and a second component (Iq) in phase with said three-phase voltage from a three-phase current (Iu, Iv, Iw) flowing through said reactors; a first command value generating section (108, 110, 113) for determining a fourth command value (Vid*), based on said first component; a second command value generating section (105, 106, 107, 109, 112) for determining a second component command value (Iq*) that is the command value of said second component, based on a difference between said output voltage (Vdc) and said command value (Vdc*) of said output voltage, to determine a fifth command value (Viq*), based on a difference between said second component and said command value of said second component; and a two-phase to three-phase converter (104) for determining said first to third command values (Vr*, Vs*, Vt*) from said fourth command value and said fifth command value.

A fourth aspect of the apparatus for controlling the converter according to the present invention is the third aspect thereof having a frequency band that is three times the frequency of said three-phase voltage (Vu, Vv, Vw) or more.

A fifth aspect of the apparatus for controlling the converter according to the present invention is the fourth aspect thereof wherein the frequency of said AC waveform (VK) is three times the frequency of said three-phase voltage (Vu, Vv, Vw) or more.

A sixth aspect of the apparatus for controlling the converter according to the present invention is the fifth aspect thereof wherein said first command value generating section includes a first correction section (115, 116, 117, 118, 120) for correcting said first component (Id) using a first harmonic (cos 3 ωt) having a frequency three times the frequency of said three-phase voltage (Vu, Vv, Vw), and wherein said second command value generating section includes a second correction section (114, 116, 117, 119, 121) for correcting said second component (Iq) using a second harmonic (sin 3 ωt) perpendicular in phase to said first harmonic.

Effect of the Invention

According to the first aspects of the method of and apparatus for controlling the converter according to the present invention, in the switching for controlling which one of the three ends of the reactor group is to be connected to the connection point, the closer to the command value of the midpoint potential the values of the first to third command values are, the greater the duty at which the second ends of the respective reactors corresponding thereto are connected to the connection point is for pulse width modulation. Thus, the potential at the connection point is set to the midpoint potential. Additionally, the predetermined range to be compared with the first to third command values has the predetermined potential width with respect to the AC waveform centered around the command value of the midpoint potential. This eliminates the need to detect the polarities of a power supply voltage and a current flowing through the converter for the pulse width modulation.

According to the second aspects of the method of and apparatus for controlling the converter according to the present invention, waveforms that specify the upper and lower limits of the predetermined range are easily obtainable.

According to the third aspects of the method of and apparatus for controlling the converter according to the present invention, controlling reactive power to zero improves a power factor.

According to the fourth aspects of the method of and apparatus for controlling the converter according to the present invention, as the capacitance ratio between the first capacitor and the second capacitor deviates further from "1," the second-order harmonics of the currents flowing through the reactors increase. The second-order harmonics appear as third-order harmonics in the first component and the second component. Thus, setting the band in which the fourth command value and the fifth command value are determined to three times the frequency of the three-phase voltage or greater decreases the second-order harmonics of the currents flowing through the reactors.

According to the fifth aspects of the method of and apparatus for controlling the converter according to the present invention, the second-order harmonics of the currents flowing through the reactors are reduced.

According to the sixth aspects of the method of and apparatus for controlling the converter according to the present invention, the third-order harmonics of the first component and the second component are canceled when the fourth command value and the fifth command value are determined. This achieves further reduction in the second-order harmonics of the currents flowing through the reactors.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a circuit diagram showing the configuration of a three-level converter to which an embodiment of the present invention is applied and its surroundings;

FIG. 2 is a circuit diagram illustrating the configuration of a PWM modulating section;

FIG. 6 is a block diagram illustrating the configuration of an interference term generating section;

FIG. 8 is a graph showing the waveform of a three-phase current when a midpoint potential approaches a low potential side to enter a non-equilibrium state;

FIG. 9 is a graph showing the waveform of a two-phase current when the midpoint potential approaches the low potential side to enter the non-equilibrium state;

FIG. 10 is a graph showing the waveform of the three-phase current when the midpoint potential approaches a high potential side to enter the non-equilibrium state;

FIG. 11 is a graph showing the waveform of the two-phase current when the midpoint potential approaches the high potential side to enter the non-equilibrium state;

FIG. 18 is a circuit diagram of still another conventional three-level converter.

BEST MODE FOR CARRYING OUT THE INVENTION

Figure 3:
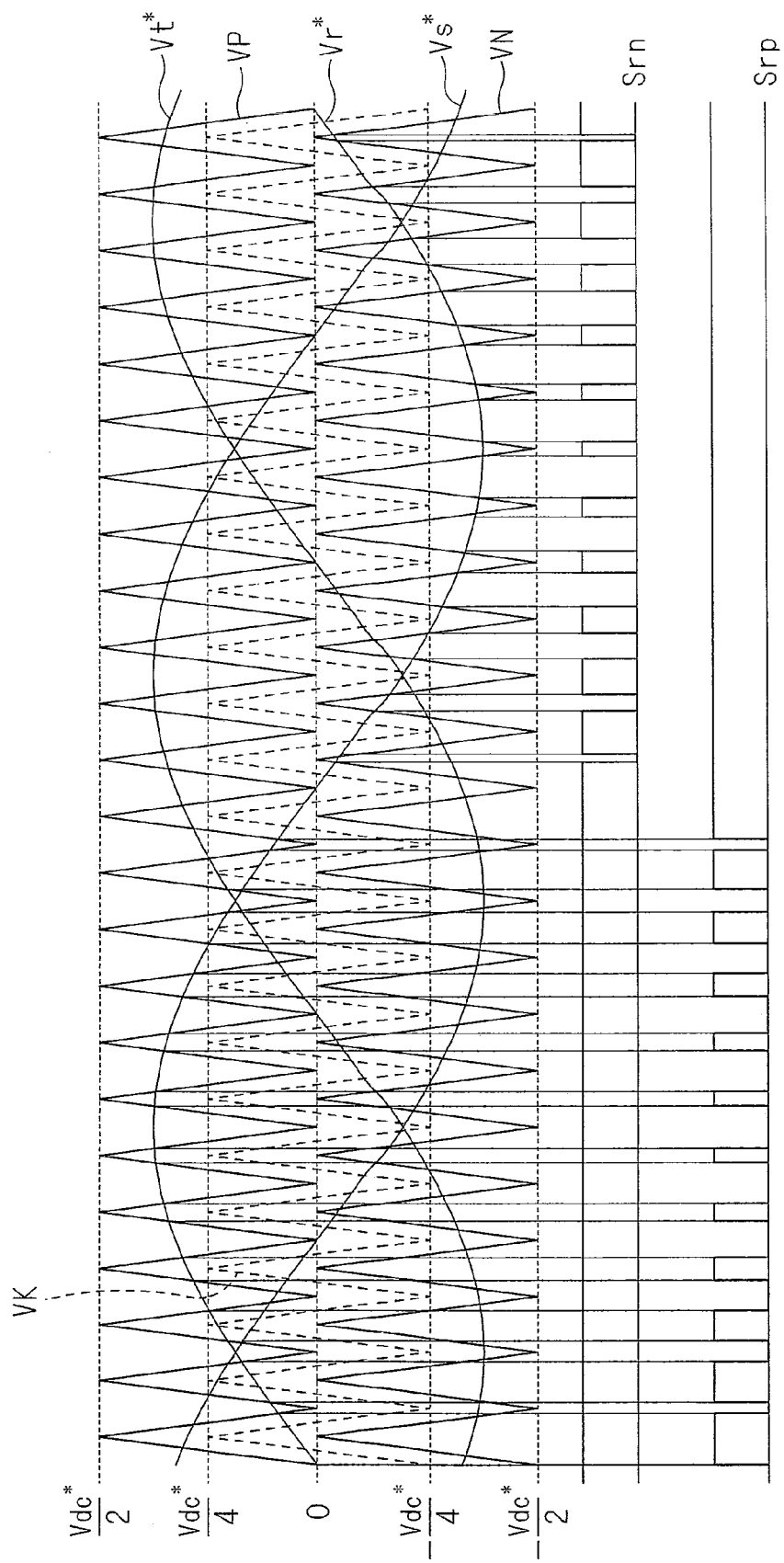
FIG. 3 is a graph showing the operation of the PWM modulating section.

FIG. 1 is a circuit diagram showing the configuration of a three-level converter 200 to which the present invention is applied and its surroundings. The three-level converter 200 is connected through a reactor group 202 to a three-phase power supply 201.

A three-phase voltage presenting potentials Vu, Vv and Vw is outputted from the three-phase power supply 201, and three phase currents Iu, Iv and Iw correspondingly flow through the reactor group 202. The three-level converter 200 receives the currents Iu, Iv and Iw, and input potentials Vr, Vs and Vt are correspondingly generated.

The three-level converter 200 includes a rectifier circuit 203 at its input, and capacitors 204 and 205 at its output. The rectifier circuit 203 applies a high potential VH and a midpoint potential VQ to the capacitor 204, and applies a low potential VL and the midpoint potential VQ to the capacitor 205. The capacitors 204 and 205 correspond to the capacitors 6 and 7 shown in FIGS. 16 and 18, and to the capacitors (without reference numerals) charged to the voltage of Vd/2 in FIG. 17.

Figure 16:
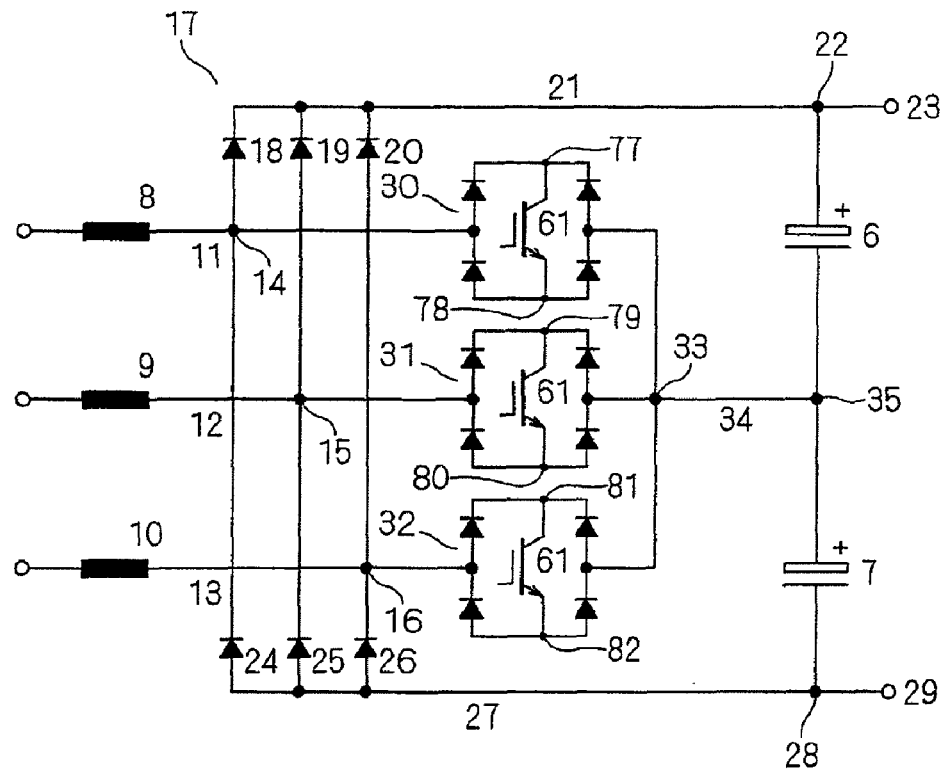
FIG. 16 is a circuit diagram of a conventional three-level converter.
Figure 17:
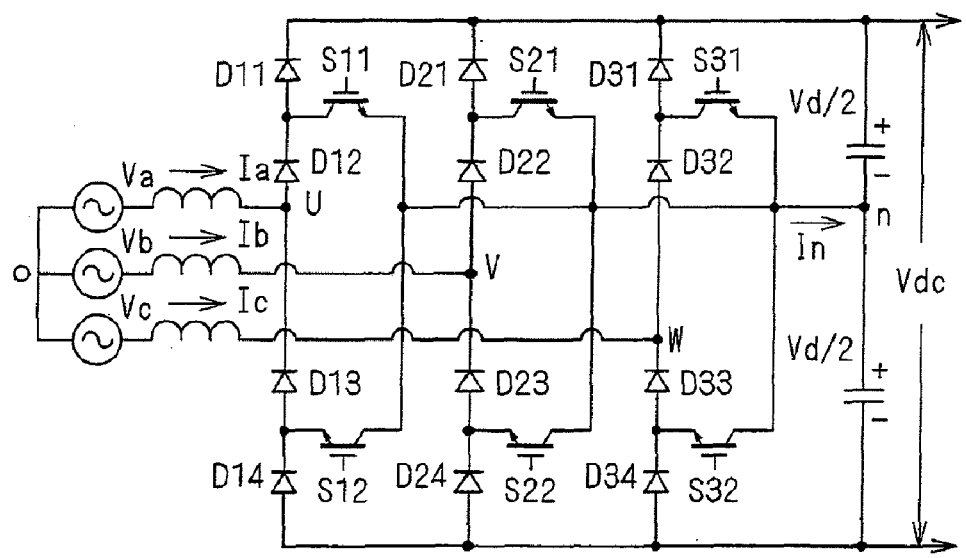
FIG. 17 is a circuit diagram of another conventional three-level converter.
Figure 18:
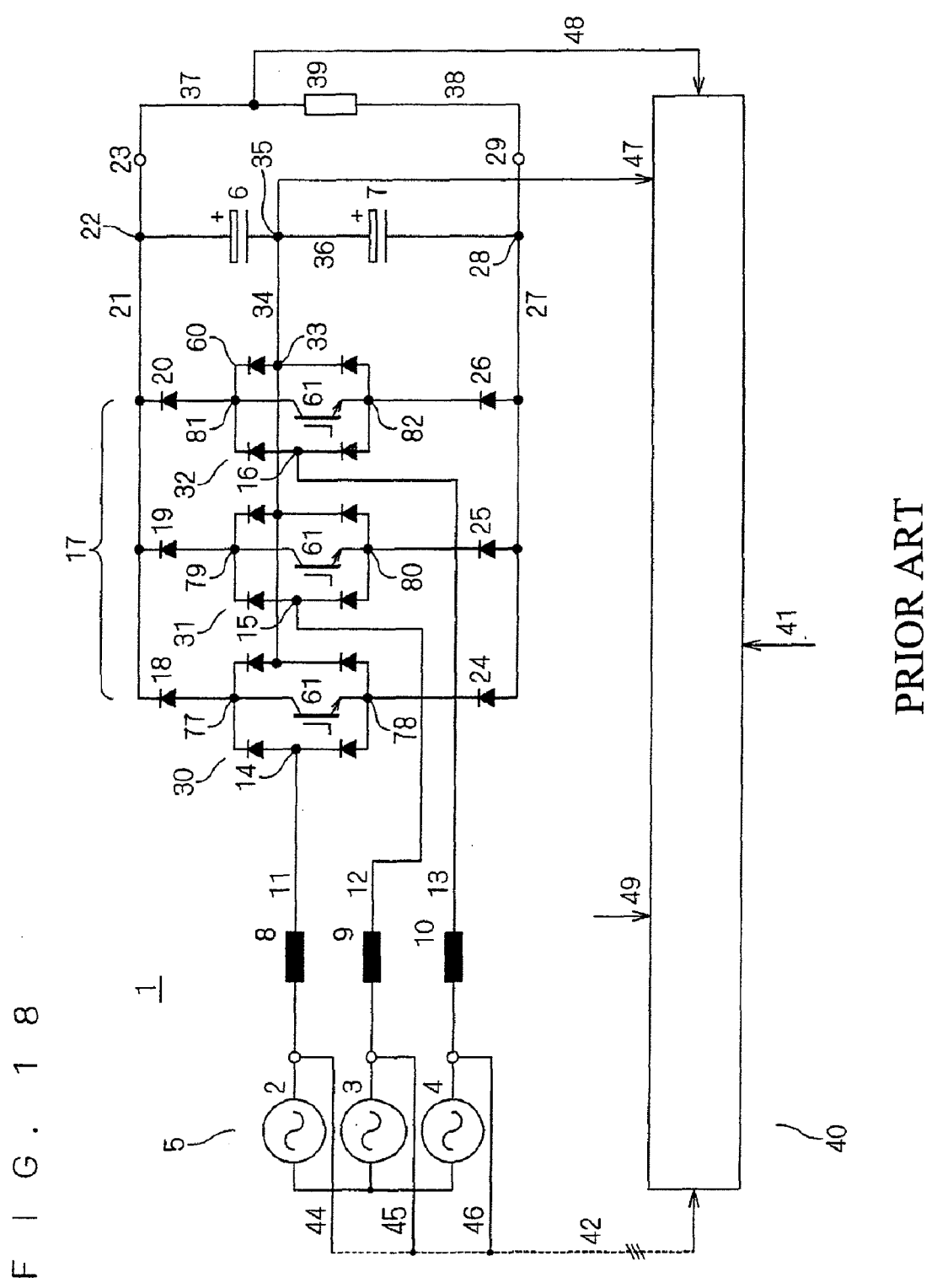

The reactor group 202 corresponds to the inductors 8, 9 and 10 shown in FIGS. 16 and 18, and to the coils (without reference numerals) through which the currents Ia, Ib and Ic flow in FIG. 17.

The rectifier circuit 203 includes a three-phase diode bridge, and a switch group. The three-phase diode bridge rectifies the potentials Vr, Vs and Vt to output the low potential VL and the high potential VH. The switch group selectively connects three ends (corresponding to second ends when the ends of the reactor group 202 on the three-phase power supply 201 side are regarded as first ends) of the reactor group 202 opposite from the three-phase power supply 201 to a connection point N that connects the capacitors 204 and 205 to each other.

The set of diodes 18, 19, 20, 24, 25 and 26 shown in FIGS. 16 and 18, and the set of diodes D11, D21, D31, D14, D24 and D34 shown in FIG. 17 may be employed as the three-phase diode bridge.

The bidirectional switches 30, 31 and 32 shown in FIGS. 16 and 18, and the switches S11, S21, S31, S12, S22 and S32 shown in FIG. 17 may be employed as the switch group.

A switching signal generating section 100 includes a voltage command value generating section 101, and a PWM modulating section 102. The voltage command value generating section 101 receives the measurement values of the potentials Vu, Vv and Vw to calculate the command values of the input potentials Vr, Vs and Vt. Since the measurement of the potentials Vu, Vv and Vw is known art, merely the potentials Vu, Vv and Vw are shown as inputted to the voltage command value generating section 101 by using arrows in FIG. 1 for purposes of simplification. Other arrows inputted to blocks indicate similar meaning.

The PWM modulating section 102 generates either switching signals Sr, Ss and St or switching signals Srp, Ssp, Stp, Sm, Ssn and Stn, based on command values Vr*, Vs* and Vt* of the three-phase voltage. The switching signals Sr, Ss and St may be employed as gate signals to the respective bidirectional switches 30, 31, and 32 shown in FIGS. 16 and 18. The switching signals Srp, Ssp, Stp, Sm, Ssn and Stn may be employed as gate signals to the respective switches S11, S12, S21, S22, S31 and S32 shown in FIG. 17.

When the command values Vr*, Vs* and Vt* are in a predetermined range to be described later, the switch group of the rectifier circuit 203 connects the second ends of the reactor group 202 corresponding to the respective command values to the connection point N.

More specifically, with reference to FIG. 16 or 18, when the command value Vr* is in the predetermined range to be described later, the switching signal Sr brings the bidirectional switch 30 into conduction to connect the terminal 14 connected to the inductor 8 to the intermediate point 35 through the neutral point 33 and the feeder 34. Likewise, when the command value Vs* is in the predetermined range to be described later, the switching signal Ss brings the bidirectional switch 31 into conduction to connect the terminal 15 to the intermediate point 35. When the command value Vt* is in the predetermined range to be described later, the switching signal St brings the bidirectional switch 32 into conduction to connect the terminal 16 to the intermediate point 35.

With reference to FIG. 17, when the command value Vr* is in the predetermined range to be described later, the switching signals Srp and Sm bring the switches S11 and S12, respectively, into conduction to connect an end (a point indicated by the reference character "U" in the figure, at which the diodes D12 and D13 are connected to each other) of a U-phase coil opposite from the power supply to the neutral point n. It should be noted that the function of the diodes D12 and D13 causes the current Ia to flow through any one of the switches S11 and S12 in accordance with the result of comparison between the potential at the above-mentioned end of the above-mentioned coil and the potential at the neutral point n. Likewise, when the command value Vs* is in the predetermined range, the switching signals Ssp and Ssn bring the switches S21 and S22, respectively, into conduction to connect an end (a point indicated by the reference character "V" in the figure, at which the diodes D22 and D23 are connected to each other) of a V-phase coil opposite from the power supply to the neutral point n. It should be noted that the function of the diodes D22 and D23 causes the current Ib to flow through any one of the switches S21 and S22 in accordance with the result of comparison between the potential at the above-mentioned end of the above-mentioned coil and the potential at the neutral point n. When the command value Vt* is in the predetermined range, the switching signal Stp and Stn bring the switches S31 and S32, respectively, into conduction to connect an end (a point indicated by the reference character "W" in the figure, at which the diodes D32 and D33 are connected to each other) of a W-phase coil opposite from the power supply to the neutral point n. It should be noted that the function of the diodes D32 and D33 causes the current Ic to flow through any one of the switches S31 and S32 in accordance with the result of comparison between the potential at the above-mentioned end of the above-mentioned coil and the potential at the neutral point n.

FIG. 2 is a circuit diagram illustrating the configuration of the PWM modulating section 102. FIG. 3 is a graph showing the operation of the PWM modulating section 102. For purposes of simplification, it is assumed that the midpoint potential VQ is equal to zero in the following description. However, the present embodiment and thus the present invention do not limit the midpoint potential to this value.

A potential VN is an AC potential having a minimum value of ($-Vdc^*/2$) and a maximum value of $Vdc^*/2$, and is generated by a signal source 102a. The voltage of $Vdc^*/2$ serves as the command value of the voltages to which the capacitors 204 and 205 are charged. A potential VP is set at a value higher than the potential VN by the voltage of $Vdc^*/2$. The voltage of $Vdc^*/2$ may be generated, for example, by a DC voltage source 102b.

The above-mentioned predetermined range used herein is a range not greater than the potential VP and not less than the potential VN. An AC waveform VK centered around the midpoint potential VQ (=0) and having an amplitude of $Vdc^*/4$ is introduced. This allows the above-mentioned predetermined range to be grasped as a range having a potential width of $Vdc^*/4$ with respect to the AC waveform VK.

A comparator 102rp makes a comparison as to whether the command value Vr* is greater than the potential VP or not, and a comparator 102rn makes a comparison as to whether the command value Vr* is greater than the potential VN or not. A comparator 102sp makes a comparison as to whether the command value Vs* is greater than the potential VP or not, and a comparator 102sn makes a comparison as to whether the command value Vs* is greater than the potential VN or not. A comparator 102tp makes a comparison as to whether the command value Vt* is greater than the potential VP or not, and a comparator 102tn makes a comparison as to whether the command value Vt* is greater than the potential VN or not. Each of the comparators outputs a logical value "1" when the result of judgment is affirmative, and outputs a logical value "0" when the result of judgment is negative.

The logical values outputted from the comparators 102rp, 102sp and 102tp are inverted by inverters 102ri, 102si and 102ti, respectively, to be outputted. The logical values outputted from the comparators 102rn, 102sn and 102tn, and the logical values outputted from the inverters 102ri, 102si and 102ti become the switching signals Sm, Ssn, Stn, Srp, Ssp and Stp, respectively. When the logical values of the switching signals Sm, Ssn, Stn, Srp, Ssp and Stp are "1," the switches S12, S22, S32, S11, S21 and S31 (with reference to FIG. 17) which receive the logical values are conducting. When the logical values of the switching signals Sm, Ssn, Stn, Srp, Ssp and Stp are "0," the switches S12, S22, S32, S11, S21 and S31 are non-conducting.

The PWM modulating section 102 may further include AND gates 102rg, 102sg and 102tg which output the switching signals Sr, Ss and St, respectively, because these are suitable for controlling the bidirectional switches 30, 31 and 32 (with reference to FIG. 16 or 18). Specifically, the AND gate 102rg adopts a logical product of the switching signals Sm and Srp to generate the switching signal Sr. Likewise, the AND gate 102sg adopts a logical product of the switching signals Ssn and Ssp to generate the switching signal Ss, and the AND gate 102tg adopts a logical product of the switching signals Stn and Stp to generate the switching signal St.

It is apparent from the operation of the comparator 102rn and the graph of FIG. 3 that the switching signal Sm has a logical value "1" (a high potential in the graph) or a logical value "0" (a low potential in the graph) respectively when the command value Vr* is "greater" or "less" than the potential VN. It is also apparent from the operations of the comparator 102rp and the inverter 102ri and the graph of FIG. 3 that the switching signal Srp has a logical value "1" or "0" respectively when the command value Vr* is "less" or "greater" than the potential VP.

In other words, when the command value Vr* is in the above-mentioned predetermined range, the end (the terminal 14 of FIGS. 16 and 18; and the point U of FIG. 17) of the reactor opposite from the power supply is connected to the connection point N. The same is true for the command values Vs* and Vt*.

In the switching for controlling which one of the three ends of the reactor group 202 is to be connected to the connection point N, the closer to the command value of the midpoint potential VQ the command values Vr*, Vs* and Vt* are, the greater the duty at which the second ends of respective reactors corresponding thereto are connected to the connection point is for the pulse width modulation. Thus, the potential at the connection point N is set to the command value of the midpoint potential VQ. Additionally, the predetermined range to be compared with the command values Vr*, Vs* and Vt* has a predetermined potential width with respect to the AC waveform VK centered around the command value of the midpoint potential VQ. This eliminates the need to detect the polarities of the power supply voltage and the current flowing through the converter for the pulse width modulation. The technique of performing pulse width modulation by comparing such two potentials VP and VN as carriers with the command value is known as unipolar modulation, and is presented, for example, in Japanese Patent No. 2754519 and Compiled by the Institute of Electrical Engineers of Japan (IEEJ), Semiconductor Power Conversion System Investigation Expert Committee, "Power Electronics Circuit", Ohmsha, Ltd., pp. 176-177, Nov. Heisei 12 (2000).

It is desirable that the amplitude (peak-to-peak) of the AC waveform VK and the predetermined potential width are equal to $Vdc^*/2$ that is one-half the command value $Vdc^*$ of the output voltage Vdc obtained by subtracting the low potential VL from the high potential VH. This is because the waveforms of the potentials VP and VN specifying the upper and lower limits of the predetermined range are easily obtainable.

Figure 4:
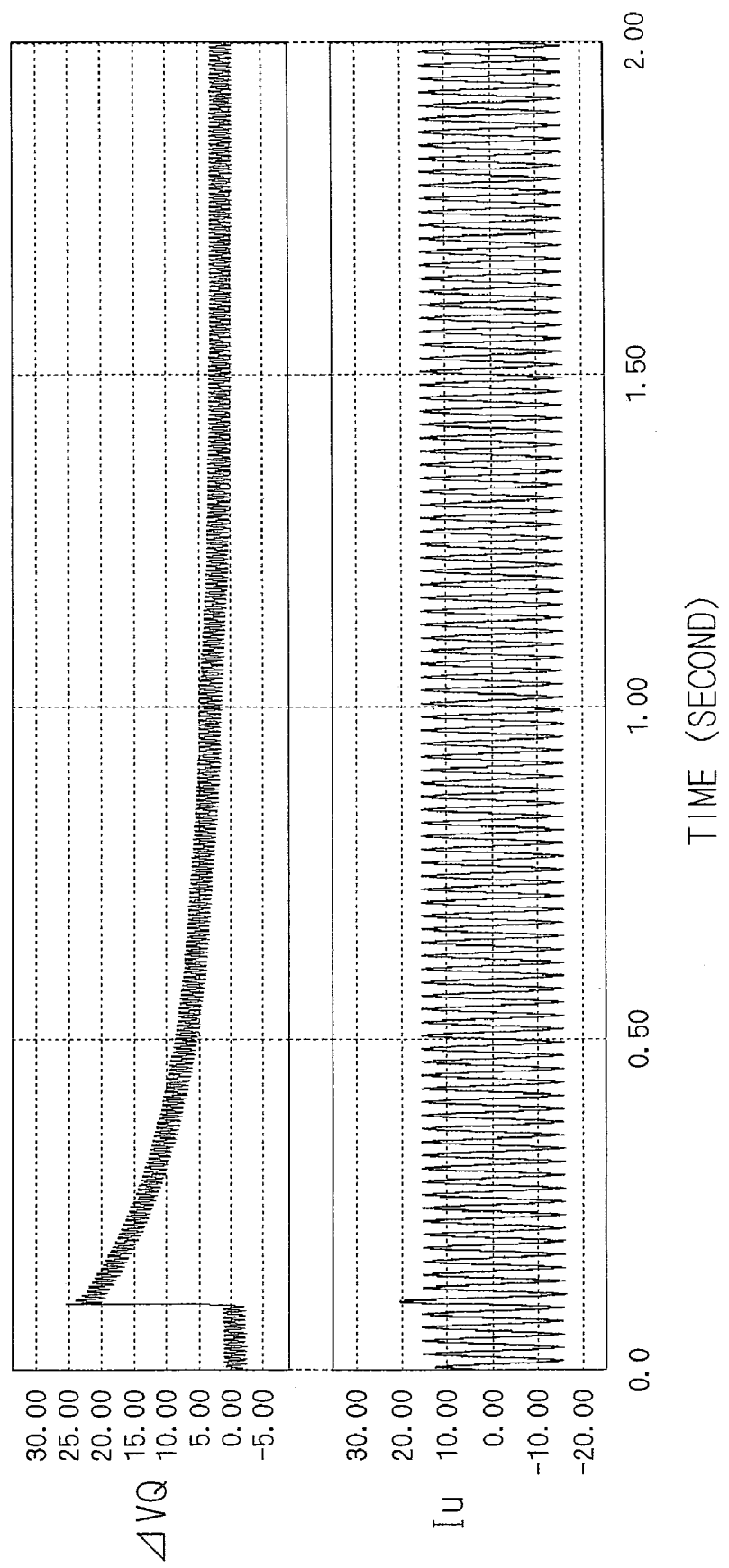
FIG. 4 is a graph showing a first example of operation according to the present embodiment.

FIG. 4 is a graph showing a first example of operation according to the present embodiment. The behaviors of the deviation $\Delta VQ$ of the midpoint potential VQ and the current Iu are shown when disturbance of 20V is forcedly given to the deviation $\Delta VQ$ (equal to the midpoint potential VQ multiplied by ($-1$) because the command value of the midpoint potential VQ is regarded as zero).

FIG. 4 illustrates an instance where the voltage command value generating section 101 generates the command values Vr*, Vs* and Vt* by three-phase analog processing. Specifically, the command values Vr*, Vs* and Vt* are generated using the results of analog computation based on a three-phase waveform in phase with the potentials Vr, Vs and Vt, the DC voltage Vdc (=VH−VL), and the currents Iu, Iv and Iw (all of which are measurement values).

It is found from the graph shown in FIG. 4 that the deviation $\Delta VQ$ is reduced to and stabilized at approximately 5 V approximately one second after the application of the disturbance.

Figure 5:
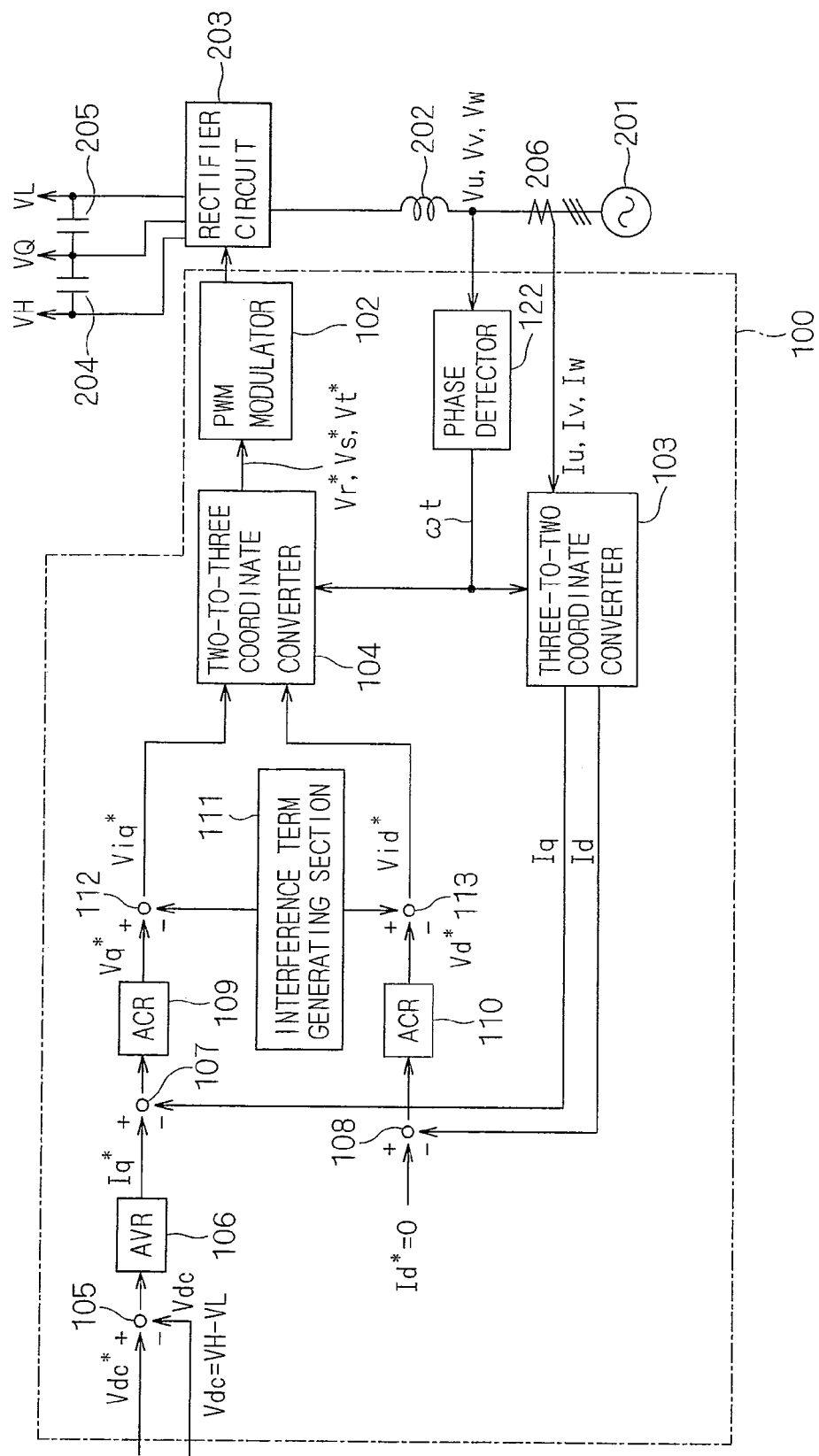
FIG. 5 is a block diagram illustrating another configuration of a switching signal generating section and its surroundings.

FIG. 5 is a block diagram illustrating another configuration of the switching signal generating section 100 and its surroundings. The technique of determining a voltage command based on a current command is known, for example, from Japanese Patent Application Laid-Open No. 2006-115609 and will be described briefly.

A current detector 206 detects the currents Iu, Iv and Iw flowing from the three-phase power supply 201 to the reactor group 202. A phase detector 122 detects the phase ω (where ω is an angular frequency, and t is time) of the potentials Vu, Vv and Vw outputted from the three-phase power supply 201. A three-phase to two-phase converter 103 makes a three-phase to two-phase conversion of the currents Iu, Iv and Iw into d- and q-axes to determine a d-axis current Id serving as a first component, and a q-axis current Iq serving as a second component. The q-axis and the d-axis are rectangular coordinate axes in a rotating coordinate system that rotates in synchronism with the phase of the potentials Vu, Vv and Vw, and the phase of the q-axis is leading the phase of the d-axis by 90 degrees. In the present embodiment, the q-axis is selected to be in phase with the there-phase voltage.

An adder-subtracter 105 outputs a deviation between the DC voltage Vdc and the command value Vdc* thereof. Based on the deviation, a voltage control section 106 determines the command value Iq* of the q-axis current. An adder-subtracter 107 outputs a deviation between the q-axis current Iq and the command value Iq*. Based on the deviation, a current control section 109 determines the command value Vq* of a q-axis voltage.

An adder-subtracter 108 outputs a deviation between the d-axis current Id and the command value Id* thereof. Based on the deviation, a current control section 110 determines the command value Vd* of a d-axis voltage. Since the d-axis current corresponds to reactive power, the command value Id* thereof is selected to be zero. This is desirable in controlling the reactive power to zero to improve a power factor.

Adder-subtracters 112 and 113 subtract interference terms from the command values Vq* and Vd* to correct the command values Vq* and Vd* to command values Viq* and Vid*, respectively. A two-phase to three-phase converter 104 makes a two-phase to three-phase conversion of the command values Viq* and Vid* to generate the command values Vr*, Vs* and Vt*.

FIG. 6 is a block diagram illustrating the configuration of an interference term generating section 111 for generating the interference terms. The interference term generating section 111 multiplies the d-axis current Id by ωL (where L is a value obtained by the two-phase conversion of the inductance of the reactor group 202) to output the product to the adder-subtracter 112, and multiplies the q-axis current Iq by (−ωL) to output the product to the adder-subtracter 113. The generation and compensation of the interference terms similar to this are also presented, for example, in Keijiroo Sakai, and three others, "Control Methods for Reduction of DC Link Capacitor and Restarting at Instantaneous Power Failure in PWM Converter", the Institute of Electrical Engineers of Japan (IEEJ), Academic Journal D, Vol. 112, No. 1, Heisei 4 (1992).

The adder-subtracters 108 and 113, and the current control section 110 may be grasped as a first command value generating section for determining the command value Vid*, based on the d-axis current Id.

The adder-subtracters 105, 107 and 112, the voltage control section 106, and the current control section 109 may be grasped as a second command value generating section for determining the command value Iq* based on the difference between the voltage Vdc and the command value Vdc* thereof to determine the command value Viq* based on the difference between the command value Iq* and the q-axis current.

Figure 7:
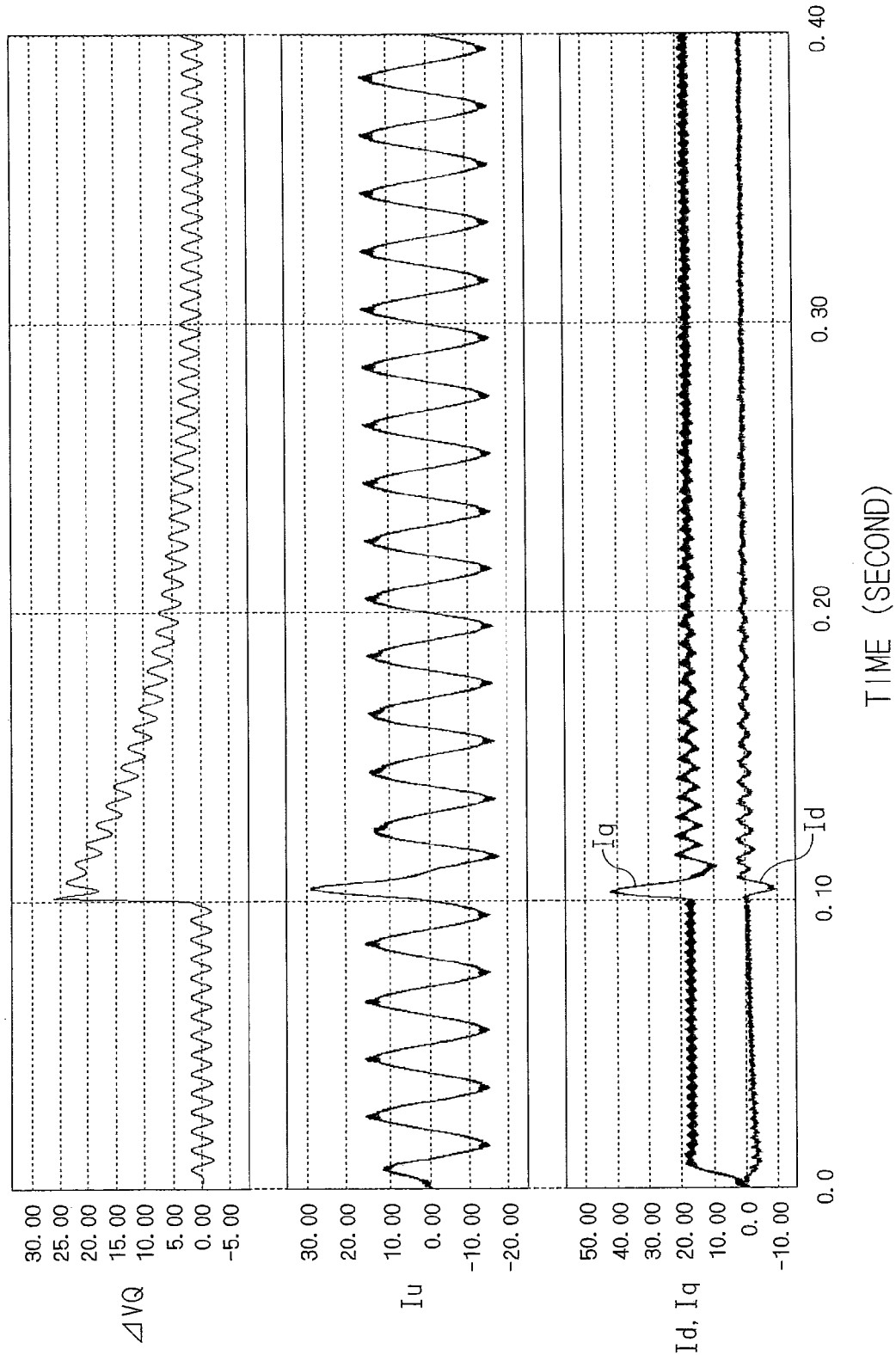
FIG. 7 is a graph showing a second example of the operation according to the present embodiment.

FIG. 7 is a graph showing a second example of the operation according to the present embodiment. The switching signal generating section 100 employs the configuration shown in FIG. 5. The graph shows that the use of the rotating coordinate system has caused pronouncedly earlier recovery from the disturbance as compared with the first example. Specifically, there is a lapse of approximately 0.1 second between the application of the disturbance and the stabilization of the deviation ΔVQ reduced to approximately 5 V.

A pulsating current is superimposed on the d-axis current Id and the q-axis current Iq. This results from the fact that the midpoint potential VQ is in a non-equilibrium state. A technique for reducing the pulsating current will be described below.

FIG. 8 is a graph showing the waveforms of the currents Iu, Iv and Iw when the midpoint potential VQ approaches a low potential PL side to enter a non-equilibrium state, and the abscissa thereof represents the phase angle of the power supply. All of these contain a second-order harmonic. The second-order harmonic Iu2 of the current Iu is illustrated in FIG. 8. The second-order harmonic Iu2 substantially reaches its peaks in positions where the current Iu reaches its peaks.

FIG. 9 is a graph showing normalized currents Id and Iq obtained by making the three-phase to two-phase coordinate conversion of the currents Iu, Iv and Iw shown in FIG. 8, and the abscissa thereof represents the phase angle of the power supply. A pulsating current is superimposed on the currents Id and Iq. Specifically, third-order harmonics are superimposed on the currents Id and Iq. It is disclosed, for example, in Fumitoshi Ichikawa, and five others, "A Control Scheme of Power Line Compensator with Multiple Function for Maintaining Power Quality", the Institute of Electrical Engineers of Japan (IEEJ), The Papers of Technical Meeting on Semiconductor Power Converter, SPC-96-127 that a current obtained by making the three-phase to two-phase coordinate conversion of a three-phase current contains a third-order harmonic when the three-phase current contains a second-order harmonic.

FIG. 10 is a graph showing the waveforms of the currents Iu, Iv and Iw when the midpoint potential VQ approaches a high potential PH side to enter the non-equilibrium state, and the abscissa thereof represents the phase angle of the power supply. Each of these contains a second-order harmonic. The second-order harmonic Iu2 of the current Iu is illustrated in FIG. 10. The second-order harmonic Iu2 substantially reaches its peaks in positions where the current Iu reaches its peaks.

FIG. 11 is a graph showing normalized currents Id and Iq obtained by making the three-phase to two-phase coordinate conversion of the currents Iu, Iv and Iw shown in FIG. 10, and the abscissa thereof represents the phase angle of the power supply. Third-order harmonics are superimposed on the currents Id and Iq.

Figure 12:
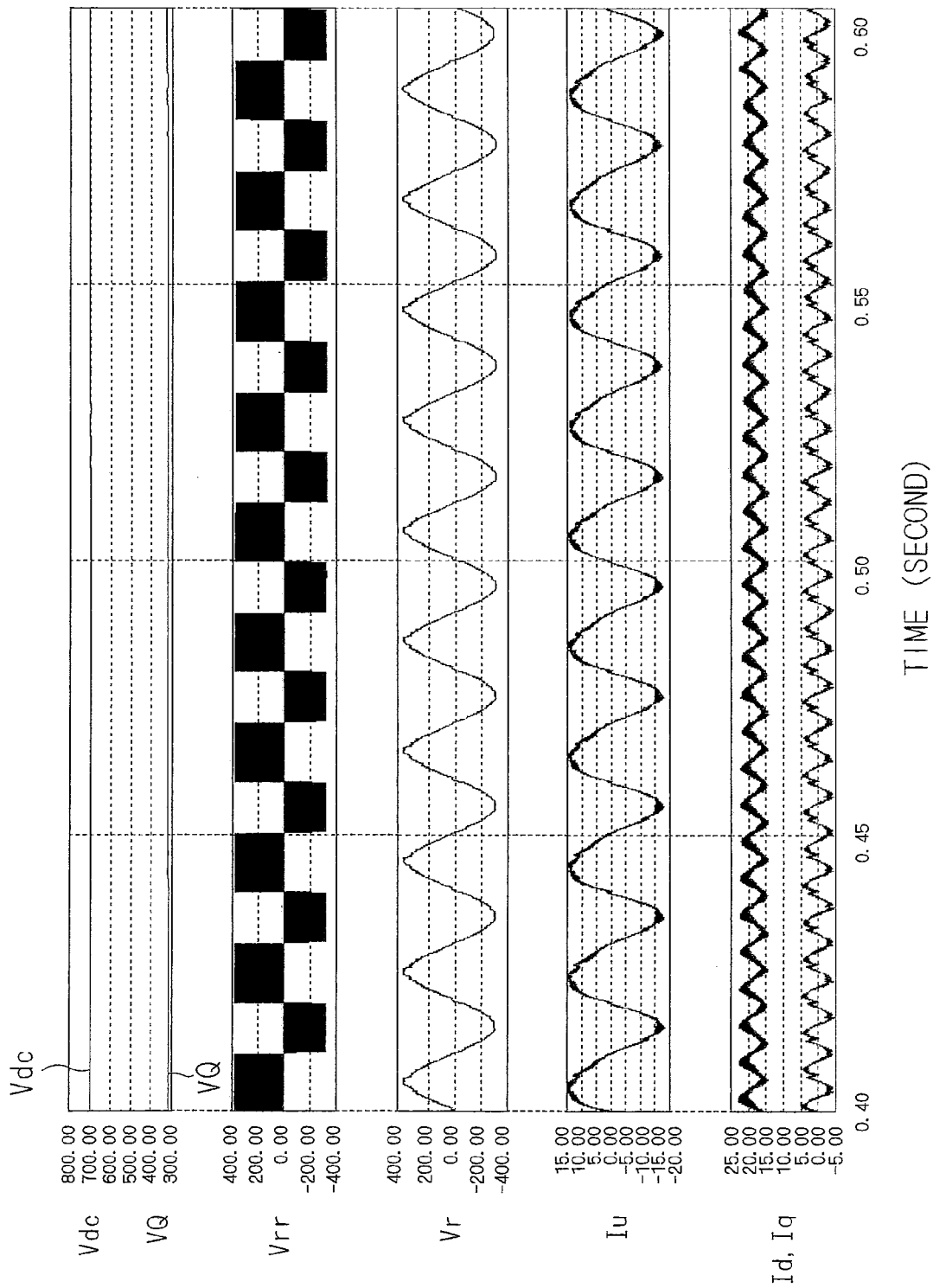
FIG. 12 is a graph showing waveforms when the midpoint potential approaches the low potential side to enter the non-equilibrium state.

FIG. 12 is a graph showing waveforms when the midpoint potential VQ approaches the low potential PL side to enter the non-equilibrium state. The midpoint potential VQ in an equilibrium state is 350 V because of the setting of PL=0 and Vdc=700 V. A potential Vrr is a potential at the input of the rectifier circuit 203 as pulse-width modulated. A potential provided by filtering the potential Vrr corresponds to a potential Vr. The current Iu is distorted in a manner such that the increasing slope is steeper than the decreasing slope. The d-axis current Id contains the third-order harmonic as shown in FIG. 9. The same is true for the q-axis current Iq.

Figure 13:
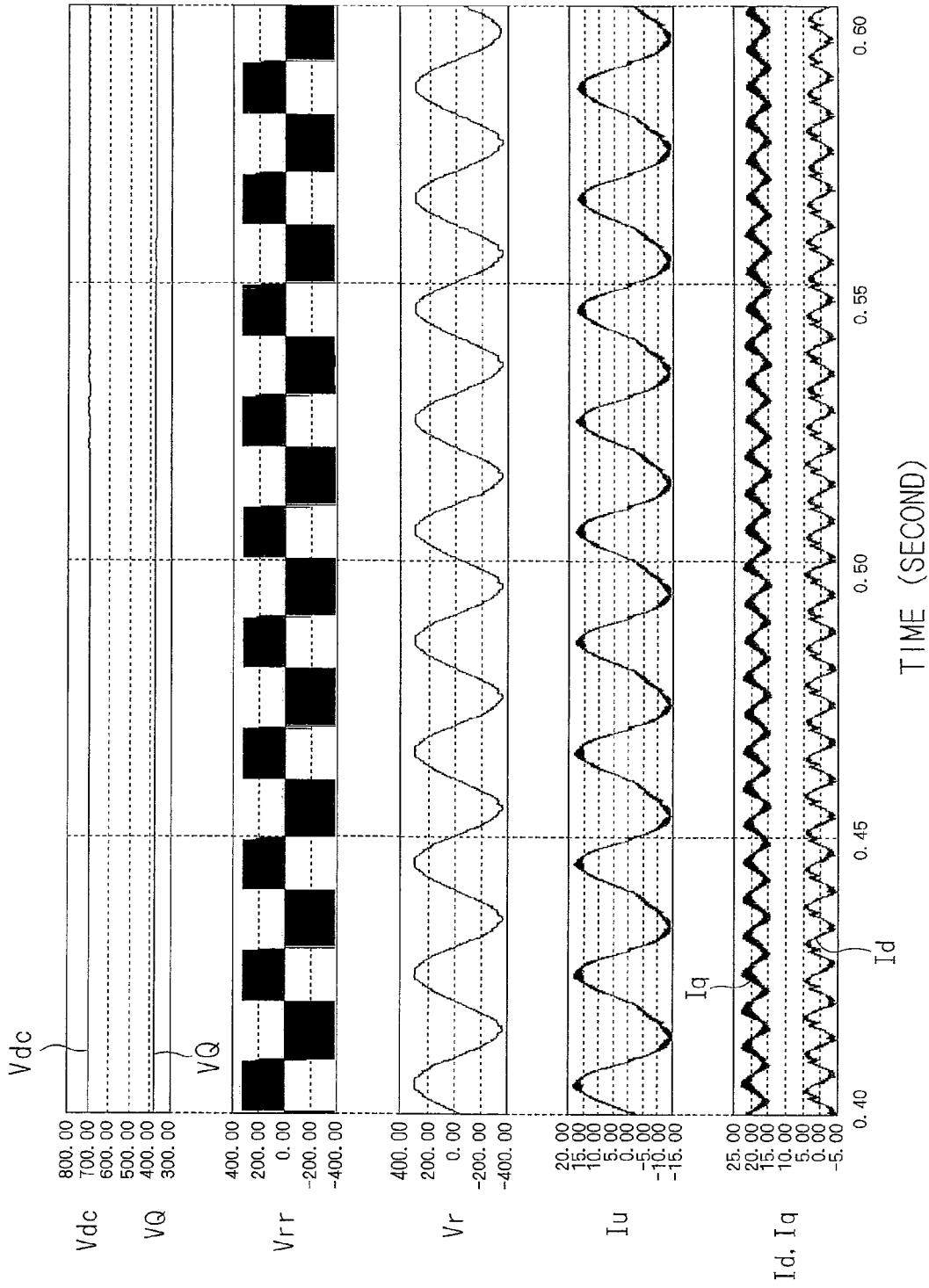
FIG. 13 is a graph showing waveforms when the midpoint potential approaches the low potential side to enter the non-equilibrium state.

FIG. 13 is a graph showing waveforms when the midpoint potential VQ approaches the high potential PH side to enter the non-equilibrium state. It is assumed that the midpoint potential VQ in the equilibrium state is 350 V as in FIG. 12. The current Iu is distorted in a manner such that the decreasing slope is steeper than the increasing slope. The d-axis current Id contains the third-order harmonic as shown in FIG. 11. The same is true for the q-axis current Iq.

As the capacitance ratio between the capacitors 204 and 205 deviates further from 1, the second-order harmonics of the three-phase currents Iu, Iv and Iw flowing through the reactor group 202 increase, as mentioned above. These second-order harmonics appear as third-order harmonics in the two-phase currents Id and Iq.

Thus, setting the band in which the command values Vid* and Viq* are determined to three times the frequency of the three-phase voltage or greater creates the possibility of decreasing the second-order harmonics of the three-phase currents Iu, Iv and Iw flowing through the reactor group 202.

Figure 14:
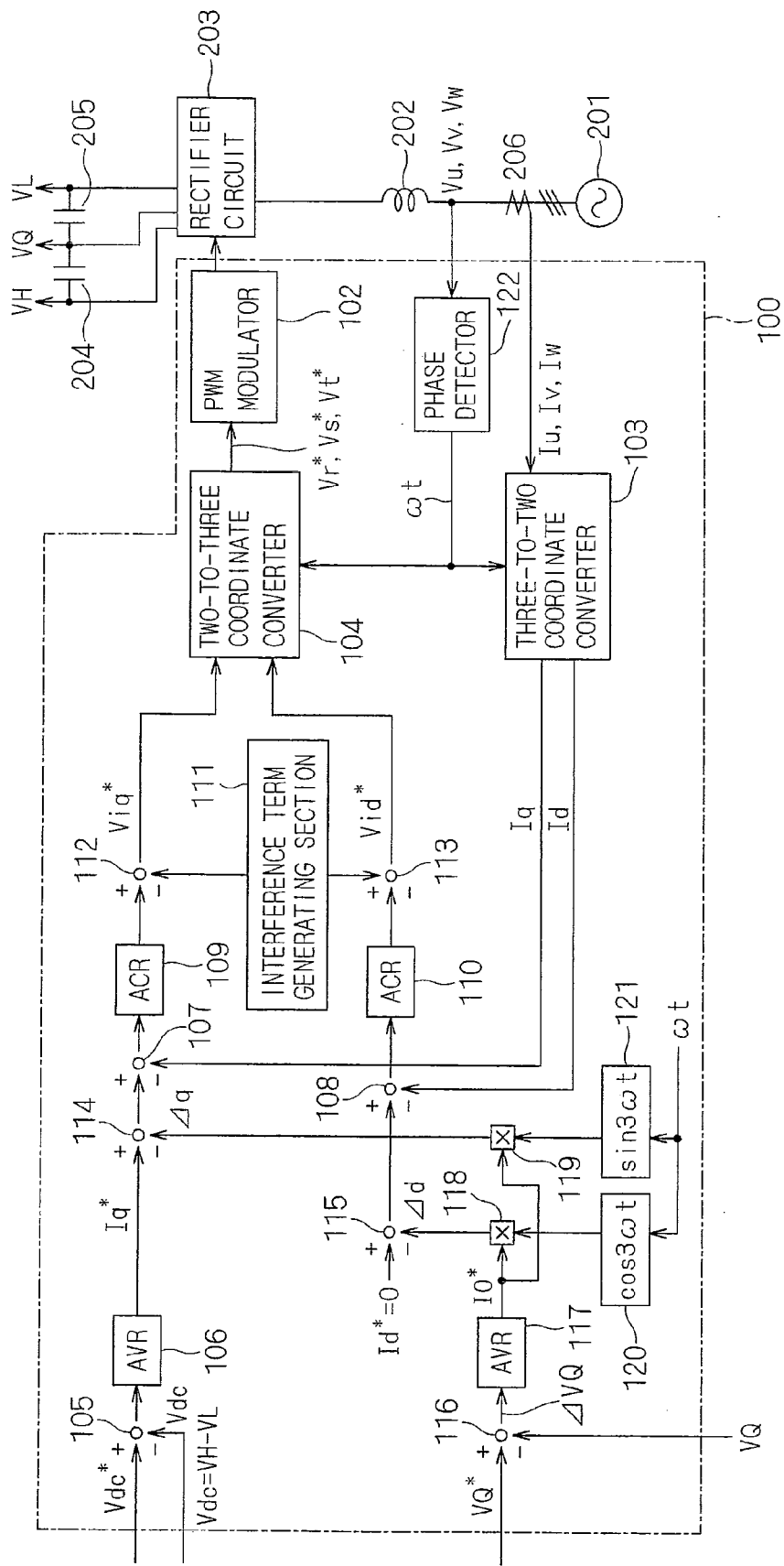
FIG. 14 is a block diagram illustrating the configuration of an improved switching signal generating section and its surroundings.

FIG. 14 is a block diagram illustrating the configuration of the switching signal generating section 100 improved based on the above-mentioned experience and its surroundings.

The configuration shown in FIG. 14 further includes adder-subtracters 114, 115 and 116, a voltage control section 117, multipliers 118 and 119, and compensation term computation sections 120 and 121 in addition to the configuration shown in FIG. 5.

The adder-subtracter 116 subtracts the midpoint potential VQ from the command value VQ* (0 V in the illustration of FIGS. 3, and 350 V in the illustration of FIGS. 12 and 13) of the midpoint potential to determine the deviation ΔVQ. The voltage control section 117 outputs a correction command value I0* based on the deviation ΔVQ. This represents the absolute value of values for correction of the current command values Iq* and Id*.

The compensation term computation sections 120 and 121 receive the phase ωt to generate compensation terms cos (3 ωt) and sin (3 ωt), respectively. These are third-order harmonic components of the sinusoidal wave of the angular frequency ω. The phase of the latter is leading the phase of the former by 90 degrees.

The multiplier 118 multiplies the correction command value I0* by cos (3 ωt) to generate a correction value Δd. The multiplier 119 multiplies the correction command value I0* by sin (3 ωt) to generate a correction value Δq. The adder-subtracter 114 subtracts the correction value Δq (=I0* sin (3 ωt)) thus obtained from the command value Iq* to correct the command value of the q-axis current. The adder-subtracter 115 subtracts the correction value Δq (=I0* cos (3 ωt)) from the command value Id* to correct the command value for the d-axis current.

Such correction using the third-order harmonic as the compensation terms is made effective by setting the band in which the command values Vid* and Viq* are determined to three times the frequency of the three-phase voltage or greater, as mentioned above. The third-order harmonics of the two-phase currents Id and Iq are canceled when the command values Vid* and Viq* are determined. This achieves further reduction in the second-order harmonics of the three-phase currents Iu, Iv and Iw flowing through the reactor group.

Figure 15:
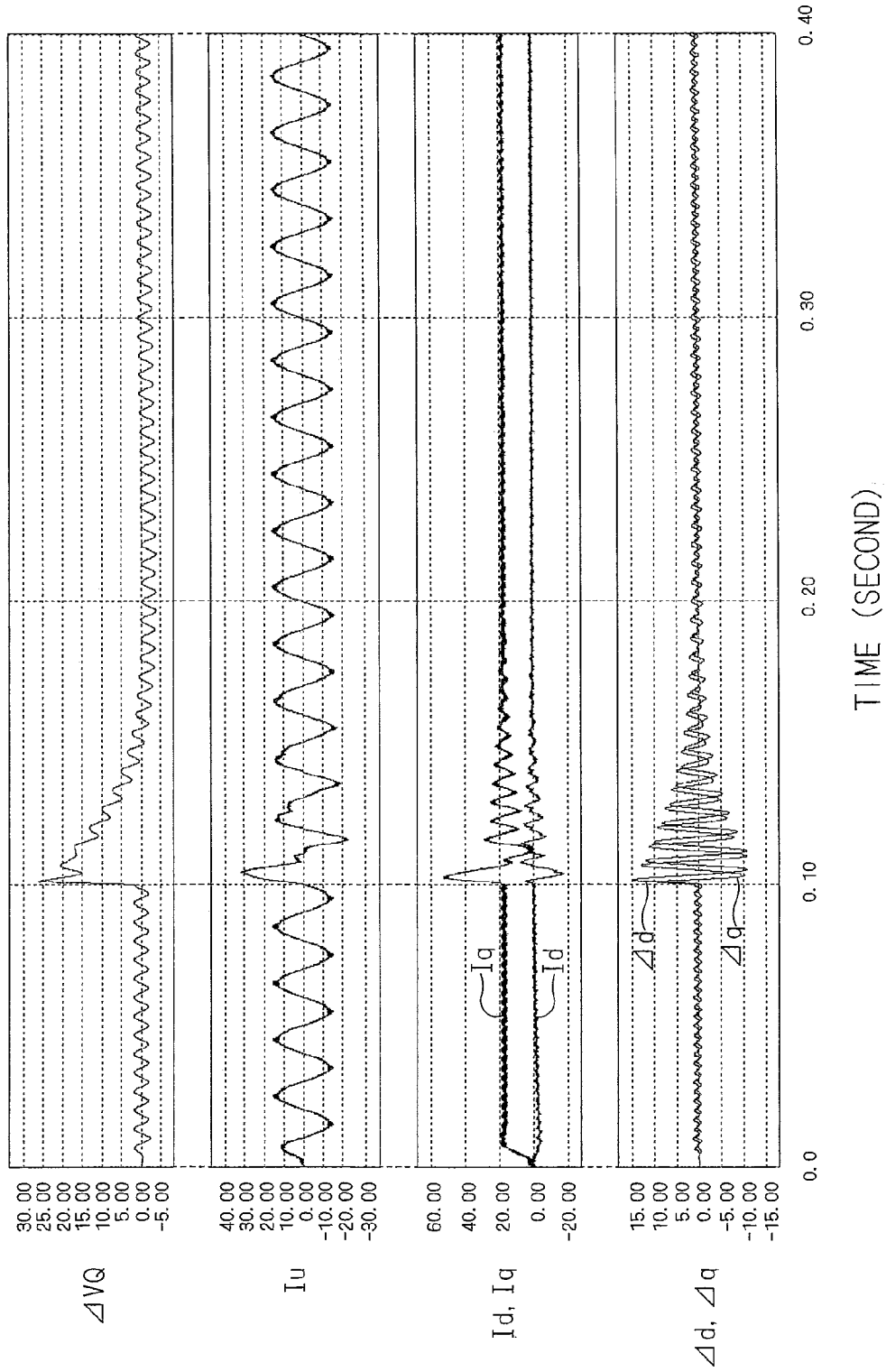
FIG. 15 is a graph showing a third example of the operation according to the present embodiment.

FIG. 15 is a graph showing a third example of the operation according to the present embodiment. The configuration shown in FIG. 14 is employed as the switching signal generating section 100. The third example shows greater fluctuations immediately after the occurrence of the disturbance, but also shows reduction in ripples in the two-phase currents Id and Iq, as compared with the second example (FIG. 17).

While the invention has been shown and described in detail, the foregoing description is in all aspects illustrative and not restrictive. It is therefore understood that numerous modifications and variations can be devised without departing from the scope of the invention.

The invention claimed is:

1. A method of controlling a converter, said converter including a rectifier circuit for outputting a low potential, a high potential higher than said low potential, and a midpoint potential between said low potential and said high potential, a first capacitor receiving said low potential and said midpoint potential, and a second capacitor connected at a connection point to said first capacitor, and receiving said high potential and said midpoint potential, said rectifier circuit including a three-phase diode bridge for rectifying first, second, and third potentials at second ends of a set of three reactors, respectively, having first ends to which a three-phase voltage is applied, to thereby output said low potential and said high potential, and a switch group for selectively connecting said second ends of said three reactors to said connection point, wherein, when first, second, and third command values that are command values for said first, second, and third potentials, respectively, are in a predetermined range, said switch group connects said second ends corresponding to the respective command values to said connection point, and wherein a range having a predetermined potential width with respect to an AC waveform centered around the command value of said midpoint potential is used as said predetermined range.

2. The method of controlling the converter according to claim 1, wherein both the amplitude of said AC waveform and said predetermined potential width are one-half the command value of the output voltage obtained by subtracting said low potential from said high potential.

3. The method of controlling the converter according to claim 2, comprising:

making a three-phase to two-phase conversion of a three-phase current flowing through said reactors to determine a first component perpendicular in phase to said three-phase voltage, and a second component in phase with said three-phase voltage;

determining a fourth command value, based on said first component;

determining a second component command value that is the command value of said second component, based on a difference between said output voltage and said command value of said output voltage;

determining a fifth command value, based on a difference between said second component and said command value of said second component; and making a two-phase to three-phase conversion of said fourth command value and said fifth command value to determine said first to third command values.

4. The method of controlling the converter according to claim 3, wherein said fourth command value and said fifth command value are determined from said first component, said second component, and said second component command value in a frequency band that is three times the frequency of said three-phase voltage or more.

5. The method of controlling the converter according to claim 4, wherein the frequency of said AC waveform is three times the frequency of said three-phase voltage or more.

6. The method of controlling the converter according to claim 5, wherein said first component is corrected using a first harmonic having a frequency three times the frequency of said three-phase voltage when said fourth command value is determined, and wherein said second component is corrected using a second harmonic perpendicular in phase to said first harmonic when said fifth command value is determined.

7. An apparatus for controlling a converter, said converter including a rectifier circuit for outputting a low potential, a high potential higher than said low potential, and a midpoint potential between said low potential and said high potential, a first capacitor receiving said low potential and said midpoint potential, and a second capacitor connected at a connection point to said first capacitor, and receiving said high potential and said midpoint potential, said rectifier circuit including a three-phase diode bridge for rectifying first, second, and third potentials at second ends of a set of three reactors, respectively, having first ends to which a three-phase voltage is applied, to thereby output said low potential and said high potential, and a switch group for selectively connecting said second ends of said three reactors to said connection point, said apparatus comprising:

a voltage command value generating section for generating first, second, and third command values that are command values for said first, second, and third potentials, respectively, from said three-phase voltage; and a pulse width modulator for generating switching signals for causing said switch group to connect said second ends corresponding to the respective command values to said connection point when said respective first, second, and third command values are in a range having a predetermined potential width with respect to an AC waveform centered around the command value of said midpoint potential.

8. The apparatus for controlling the converter according to claim 7, wherein the amplitude of said AC waveform and said predetermined potential width are one-half the command value of the output voltage obtained by subtracting said low potential from said high potential.

9. The apparatus for controlling the converter according to claim 8, further comprising:

a three-phase to two-phase converter for determine a first component perpendicular in phase to said three-phase voltage, and a second component in phase with said three-phase voltage from a three-phase current flowing through said reactors;

a first command value generating section for determining a fourth command value, based on said first component;

a second command value generating section for determining a second component command value that is the command value of said second component, based on a difference between said output voltage and said command value of said output voltage, to determine a fifth command value, based on a difference between said second component and said command value of said second component; and a two-phase to three-phase converter for determining said first to third command values from said fourth command value and said fifth command value.

10. The apparatus for controlling the converter according to claim 9, said apparatus having a frequency band that is three times the frequency of said three-phase voltage or more.

11. The apparatus for controlling the converter according to claim 10, wherein the frequency of said AC waveform is three times the frequency of said three-phase voltage or more.

12. The apparatus for controlling the converter according to claim 11, wherein said first command value generating section includes a first correction section for correcting said first component using a first harmonic having a frequency three times the frequency of said three-phase voltage, and wherein said second command value generating section includes a second correction section for correcting said second component using a second harmonic perpendicular in phase to said first harmonic.

* * * * *